US 10,165,733 B2

(12) United States Patent
Lieberstein (10) Patent No.: US 10,165,733 B2
(45) Date of Patent: *Jan. 1, 2019

(54) URN AND PLANTER COMBINATION (71) Applicant: David Lieberstein, Novato, CA (US)

(72) Inventor: David Lieberstein, Novato, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/867,127

(22) Filed: Jan. 10, 2018

(65) Prior Publication Data

US 2018/0160631 A1 Jun. 14, 2018

Related U.S. Application Data (63) Continuation of application No. 15/530,992, filed on Apr. 4, 2017, now Pat. No. 9,872,441.

(60) Provisional application No. 62/390,679, filed on Apr. 7, 2016.

(51) Int. Cl.
| | |
|---|---|
| *A01G 9/02* | (2018.01) |
| *E04H 13/00* | (2006.01) |
| *A61G 17/08* | (2006.01) |
| *A47G 7/02* | (2006.01) |
| *A61G 17/007* | (2006.01) |

(52) U.S. Cl.
CPC ............. *A01G 9/028* (2013.01); *A47G 7/025* (2013.01); *A61G 17/08* (2013.01); *E04H 13/008* (2013.01); *A61G 17/007* (2013.01); *A61G 17/0076* (2013.01); *A61G 17/0136* (2017.05)

(58) Field of Classification Search
CPC .. A61G 17/08; A61G 17/0136; A61G 17/007; A61G 17/0076; A01G 9/028; E04H 13/008; A47G 7/025

USPC ................. 27/1; 47/66.6, 66.1, 66.5, 85, 86
See application file for complete search history.

(56) References Cited

U.S. PATENT DOCUMENTS

| | | | |
|---|---|---|---|
| 4,977,652 A | 12/1990 | Graham | |
| 5,029,373 A | 7/1991 | Raymond | |
| 5,815,897 A * | 10/1998 | Longstreth | A61G 17/08 27/1 |
| 6,092,330 A * | 7/2000 | Pratt | A47G 7/06 27/30 |
| 6,112,382 A | 9/2000 | Parker | |
| 6,516,501 B2 * | 2/2003 | Vazquez-Perez | A01C 1/04 27/1 |
| 6,854,165 B1 * | 2/2005 | Parker | A61G 17/08 27/1 |
| 7,610,663 B2 * | 11/2009 | Johnson, Sr. | E04H 13/008 27/1 |

(Continued)

*Primary Examiner* — William L Miller
(74) *Attorney, Agent, or Firm* — Christopher Peil; Law Office of Christopher Peil (57) ABSTRACT

An urn and planter combination with a central plant holding cup shape, a first concentric ash and soil holding ring and a second concentric ash holding ring are contained within a main housing and covered by a main lid that has a central aperture to let the central cup protrude out. The first ring is placed around the central cup. The second ring is place around the first ring. The cup can hold a plant or bonsai tree. Slots in the outer wall of the cup correspond with slots in the inner wall of the first ring allowing the roots from the cup to migrate into the first ring thereby mingling with the ash and soil contained within the first ring. The second ring contains ash only. A secondary lid can cover the central opening of the cover.

9 Claims, 6 Drawing Sheets

(56) References Cited

U.S. PATENT DOCUMENTS

| | | | |
|---|---|---|---|
| 7,904,998 B2 * | 3/2011 | Motz | A61G 17/045 |
| | | | 206/423 |
| 8,943,657 B1 | 2/2015 | Perry | |
| 2015/0264869 A1 * | 9/2015 | Steiner | A01G 9/028 |
| | | | 47/66.6 |
| 2016/0000002 A1 * | 1/2016 | Bibaud | A01G 24/00 |
| | | | 47/56 |

* cited by examiner

URN AND PLANTER COMBINATION

CROSS REFERENCE TO RELATED APPLICATION

This application is a continuation of U.S. patent application Ser. No. 15/530,992, filed Apr. 4, 2017; and U.S. patent application Ser. No. 15/530,992 claims benefit of U.S. provisional patent application Ser. No. 62/390,679, filed Apr. 7, 2016, both of which applications are incorporated herein in their entireties.

BACKGROUND

Technical Field

This disclosure relates generally to the field of cremation urns and planters and more specifically to an urn and planter combination.

Technical Background

It is a common practice to cremate the remains of a person or pet when that person or pet dies. The resulting ashes are often put on an urn to be placed in a spot of honor in a house or office. Alternately, some people elect to disperse the ashes in a natural environment so that the ashes may mingle and become one with the environment. As an extension of this idea, it would be useful to have an urn that has the capability of connecting directly with a container that can hold a plant or bonsai tree, where the ashes in the urn can mingle with the ashes thereby infusing the plant or tree with elements found in the person or pet's ashes.

The idea of placing the remains of a pet or person in close proximity to a living plant or tree has been considered in the following patents:

U.S. Pat. No. 4,977,652 by Graham shows the idea of placing remains under a tree. But this idea is not suitable for indoor use.

U.S. Pat. No. 5,029,373 by Raymond shows an urn that has an upper soil holding part and a lower ash holding part. However, there is no provision for the ash material to mingle with the soil material.

U.S. Pat. No. 6,112,382 by Parker et al. shows a planter having a false bottom that can hold ashes, but again, there is no provision for the ash material to mingle with the soil.

U.S. Pat. No. 8,943,657 by Perry et al shows a planter having a side cavity allowing an urn to next into the side cavity, but again, there is no provision for the ash material to mingle with the soil.

Therefore there is a deficiency in the prior technology in that none of the prior designs allows the ashes of a deceased person or pet to commingle with the soil of a plant or bonsai tree for use in an indoor setting. The commingling of the ash and soil gives the owner of the combination urn and planter the comfort that some of the elements of the deceased are being used to directly feed the plant or tree and thereby having material of the deceased literally incorporated into the plant or tree.

SUMMARY

The primary object of the invention is to provide an urn and planter combination that allows a person to have a container that both holds the ashes resulting from cremation and a living plant or bonsai tree.

Another object of the invention is to provide a combination urn and planter that allows the ash remains to commingle with a soil medium so that the usable plant friendly materials found in the ashes can be drawn into the plant or tree thereby capturing elements of the deceased and recycling them into a living plant.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed an urn and planter combination comprising: a central plant holding cup shape formed by an outer wall and a bottom planar surface, a first concentric ash and soil holding ring formed by an inner wall, a bottom planar surface and an outer wall, a second concentric ash holding ring formed by an inner wall, a bottom planar surface and an outer wall, a first ring closure cap, a second ring closure cap,
an outer main housing,
an outer main lid, an outer secondary central lid,
a central cup partition sheet,
a first ring partition sheet,
said central cup shape having a plurality of vertical slots evenly spaced along its outer wall,
said first concentric ring having a plurality of vertical slots evenly spaced along its inner wall,
said central cup partition sheet placed on the inside wall of said central cup,
said first ring partition sheet placed inside said first ring's inner wall,
said first concentric ring surrounding said central cup shape,
said second concentric ring surrounding said first concentric ring,
said outer main housing surrounding said second concentric ring,
said first ring closure cap having a central aperture capable of letting said central cup protrude,
said first ring closure cap capable of tightly fitting over the top of said first concentric ring,
said second ring closure cap having a central aperture aligned with the inner wall of said second concentric ring,
said second ring closure cap capable of tightly fitting over the top of said second concentric ring,
said outer main lid including a central opening to allow the top of said central cup shape to protrude through,
said outer main lid capable of tightly fitting onto the perimeter of said outer main housing,
said outer main lid including an upwardly directed collar at the edge of said central opening,
and said outer secondary central lid including a downwardly directed collar that can tightly engage the collar of said outer main lid.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
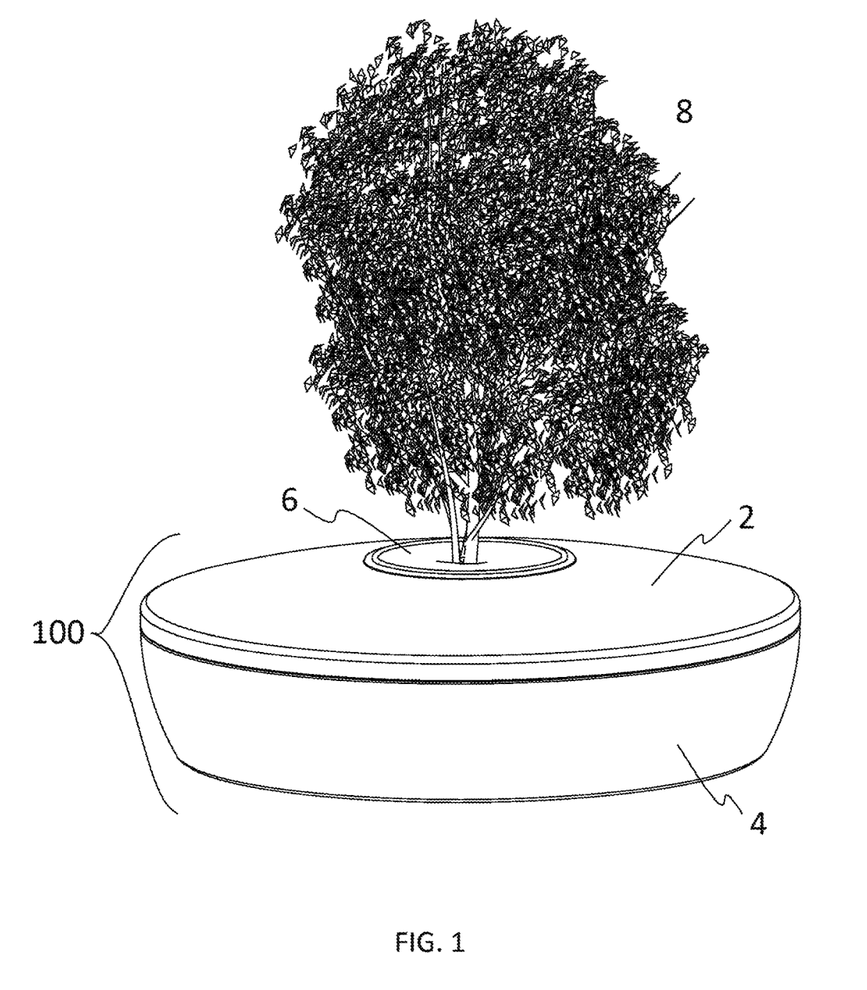
FIG. 1 is a perspective view of the invention.

Referring now to FIG. 1 we see a perspective view of the combination urn and plant holder 100 holding a bonsai tree 8. The outer housing is comprised of a main body 4 and a main lid 2. In the preferred embodiment, the outer housing 2, 4 is made of metal or ceramic, but may be made of other materials such as wood or plastic.

Figure 2:
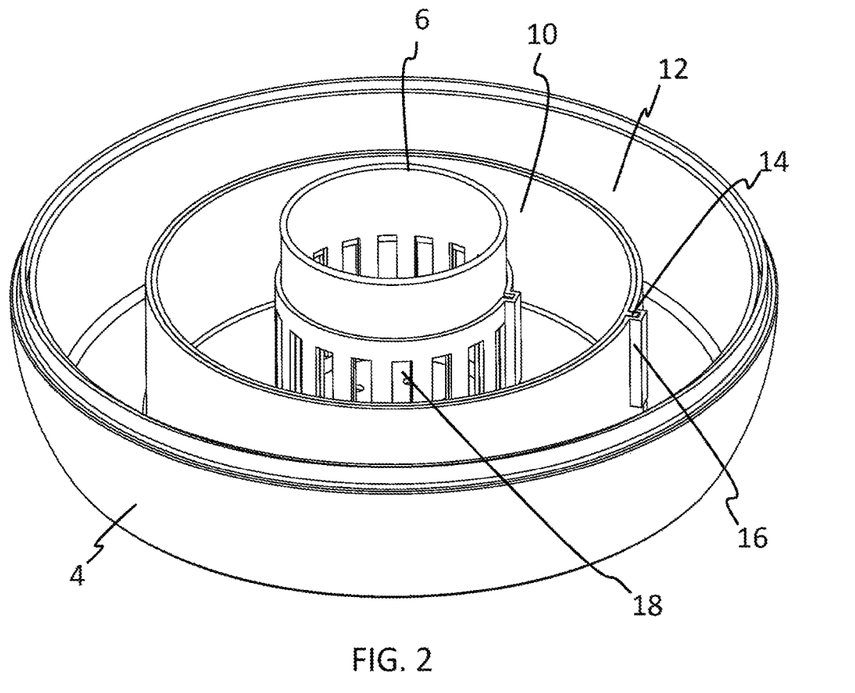
FIG. 2 is a perspective view of the interior of the invention.

FIG. 2 is a perspective view of the combination urn and planter 100 with the main lid 2 removed. A central cup 6, formed by a base plate and surrounding wall, can be filled with soil and hold a plant or bonsai tree. A strip of thin flexible material such as paper or felt 17 covers the interior wall of the cup 6 to help hold the soil in, but thin and porous enough to let the roots from the plant held in the central cup 6 migrate into the first concentric ring 10. The first concentric ring 10 is made of an inner wall, base plate and outer wall. The inner wall of the first concentric ring 10 includes vertical slots 18 which match similar slots located in the wall of the central cup. The slots of the central cup are aligned with the slots of the first ring 10 by means of an outwardly facing vertical rib 14 in cup 6 engaging a channel 16 in the inner wall of first concentric ring 10. The first concentric ring 10 holds a combination of soil and ashes that have been gathered from the remains of a person or pet. The first concentric ring 10 also includes a flexible strip of paper or porous material 19 that surrounds the inner wall of the ring 10. When the plant or tree in the central cup matures, the roots of the plant or tree will migrate through the slots 18 in the central cup and slots of the first concentric ring 10 to the soil and ash contained within the first ring 10. In this way, the elements of the ashes of the deceased will be taken up by the roots of the tree or plant thereby causing the tree or plant to embody some of the elements of the deceased. The second concentric ring 12 contains ashes only, so that the urn 100 can retain the complete contents of a person's remains which is approximately one hundred cubic inches of ash material.

Although the shape of the cup, rings and outer housing is shown as cylindrical in this embodiment, the shape can be other concentric shapes such as square, a hexagon or an octagon. Additionally, the height of the central cup shape 6 and outer housing 2, 4 can rise significantly to create a more vertical, vase-like appearance.

Figure 3:
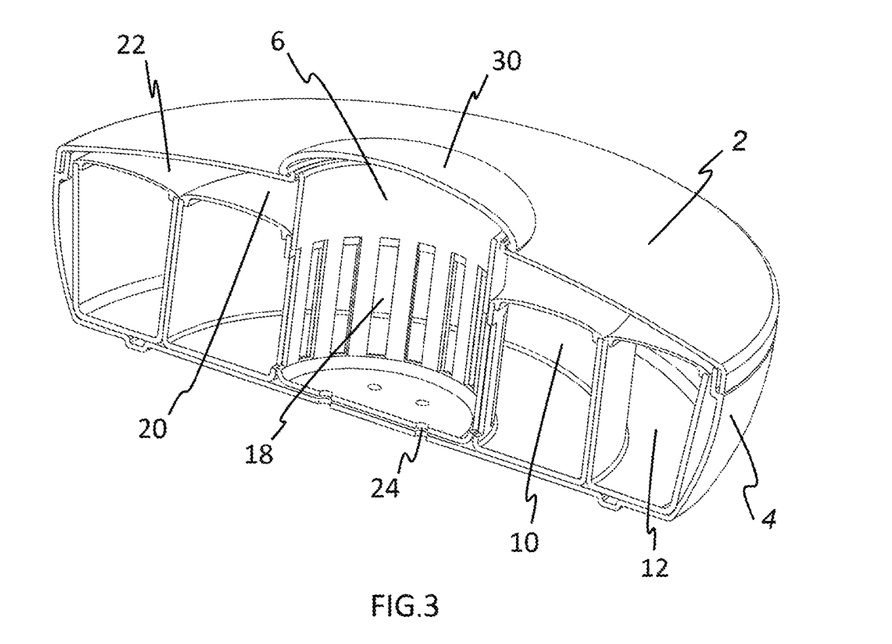
FIG. 3 is a side section view of the invention.
Figure 5:
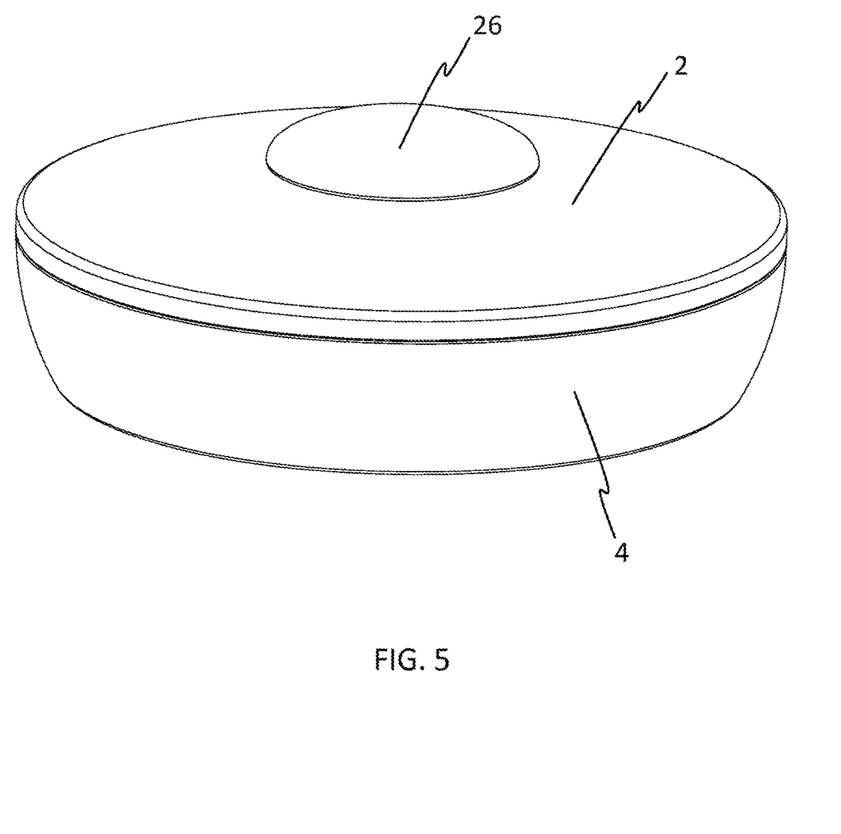
FIG. 5 is a perspective view of the invention with the secondary central top lid in place.
Figure 6:
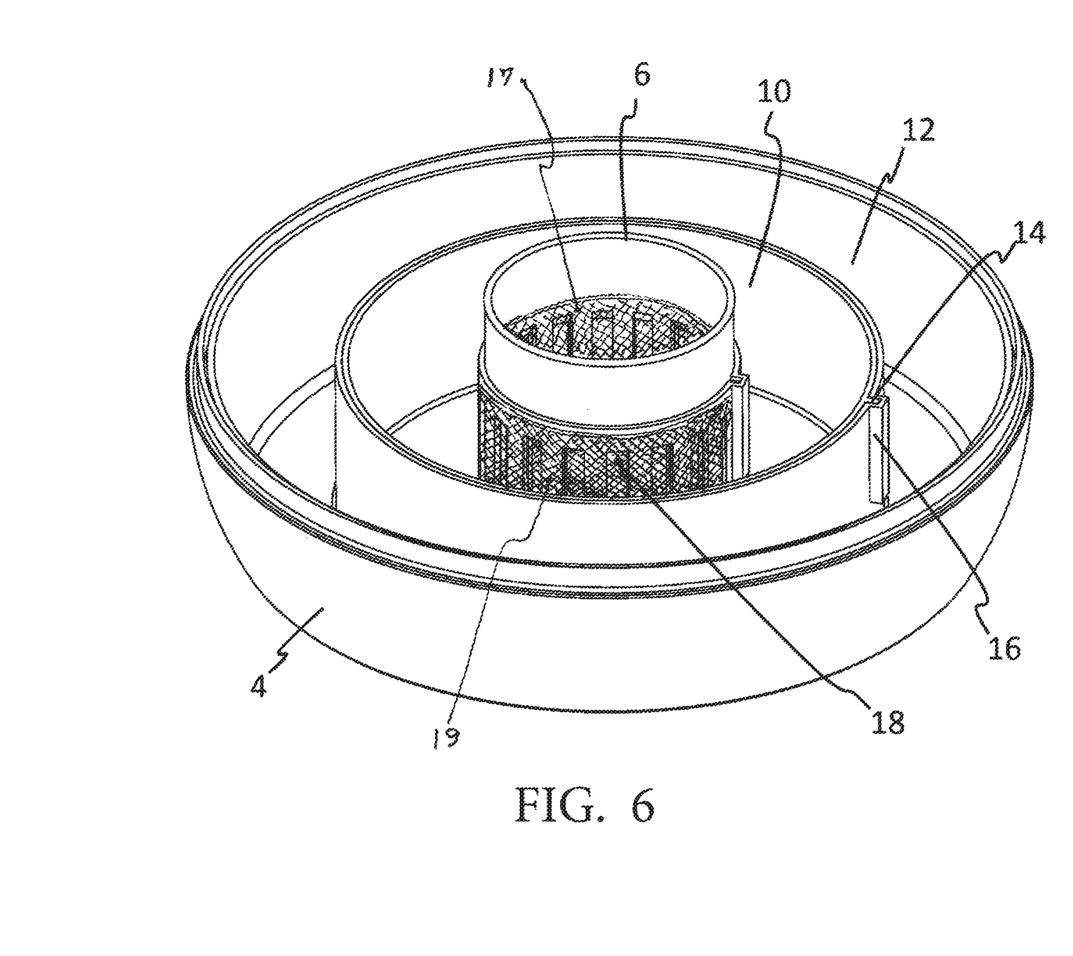
FIG. 6 is a perspective view of the interior of invention showing a central cup partition sheet and a first ring partition sheet.

FIG. 3 is a side section view of the urn planter combination 100. The first and second rings 10, 12 each have lids 20, 22 that can hold the contents without spilling during transport or storage. The main lid 2 includes an aperture that lets the central cup 6 protrude through. The main lid 2 also includes a neck 30 rising from the central aperture that allows a secondary top lid 26 to be installed, as shown in FIG. 5. This secondary lid 26 can be used during transport or if no plant is being grown in the central cup. Holes 24 in the base of central cup 6 and main housing 4 allow excess moisture to migrate out of the urn thereby reducing the chance of excess liquid buildup within the urn 100. A ring on the underside of the main housing 4 allows excess moisture to escape from the bottom of the outer housing 2 and inner cup 6.

Optionally, an additional central cup can be housed within cup 6. The additional cup would be a standard flower pot and not contain slots for the migration of roots. In this way, a person can elect to use the surrounding rings for the ash remains and have the additional cup be removable for replanting in the future.

Figure 4:
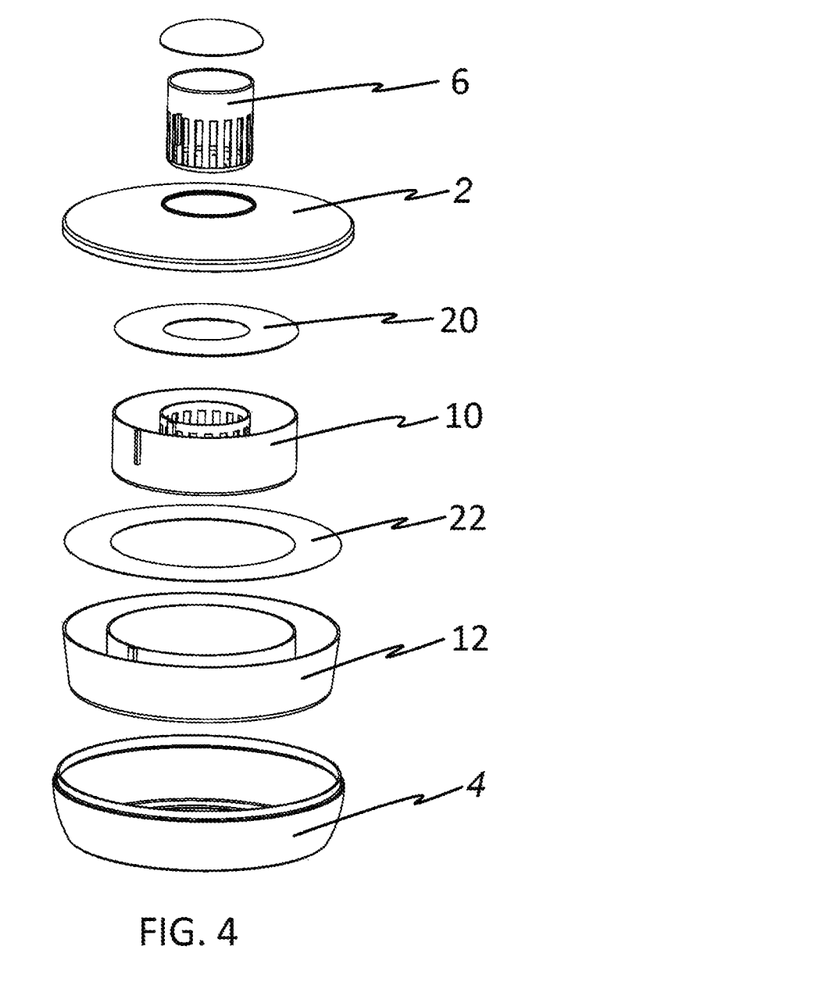
FIG. 4 is an exploded view of the invention.

FIG. 4 is an exploded view of the invention. All components can be seen in their concentric relation to each other. In the preferred embodiment, the rings 10, 12 and lids 22, 20 and central cup 6 are all made of injection molded plastic; preferably environmentally friendly recycled plastic or plastic made from corn based materials.

FIG. 5 is a perspective view of the invention 100 with the central secondary lid 26 in place, making the unit 100 ready for shipping from the crematorium to the plant or tree installation site. The first and second ring 10, 12 are prepared with soil and ash at the crematorium and then installed in the outer housing 2. The plant or tree can be installed at a florist shop or other suitable location, or the end user can install the bonsai tree or plant at their home or office.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

The invention claimed is:

1. A container that holds both of ashes resulting from cremation of a decedent and a living plant or bonsai tree comprising:
   a first compartment for containing the living plant with soil;
   at least one additional compartment in which at least a portion of the ashes of the decedent and soil co-mingle; and
   a plurality of openings communicating between said first compartment and said at least one additional compartment and providing a pathway for plant roots to migrate between the first and the at least one additional compartment;
   wherein at least some of the ashes from the decedent are incorporated into the living plant.

2. The container of claim 1, wherein the first compartment comprises a central plant holding cup formed by an outer wall and a bottom planar surface; and
   wherein the at least one additional compartment comprises:
   a first concentric ash and soil holding ring surrounding said central cup shape, the first concentric ring formed by an inner wall, a bottom planar surface and an outer wall;
   wherein said plurality of openings comprise vertical slots evenly spaced along an outer wall of said central cup; and
   wherein said plurality of openings further comprise a plurality of vertical slots evenly spaced along said inner wall of said first concentric ring;
   wherein said vertical slots in the wall of said central plant holding cup align with said vertical slots in the inner wall of said first concentric ring.

3. The container of claim 2, further comprising:
a second concentric ash holding ring formed by an inner wall, a bottom planar surface and an outer wall, said second concentric ring surrounding said first concentric ring;
a first ring closure cap having a central aperture to allow said central cup to protrude through and tightly fitting over the top of said first concentric ring; and
a second ring closure cap having a central aperture aligned with the inner wall of said second concentric ring and tightly fitting over the top of said second concentric ring.

4. The container of claim 3, further comprising
an outer main housing, said outer main housing surrounding said second concentric ring;
an outer main lid;
an outer secondary central lid;
said outer main lid including a central opening to allow the top of said central cup shape to protrude through;
said outer main lid tightly fitting onto the perimeter of said outer main housing;
said outer main lid including an upwardly directed collar at the edge of said central opening; and
said outer secondary central lid including a downwardly directed collar that tightly engages the collar of said outer main lid.

5. The container of claim 4, wherein said outer housing and lid are made of metal or a ceramic material.

6. The container of claim 2, further comprising:
a central cup partition sheet placed on the inside wall of said central cup; and
a first ring partition sheet inside said first ring's inner wall.

7. The container of claim 2, wherein said central cup includes an outwardly facing vertical rib and said first concentric ring includes an inwardly facing vertical recess to accept said outwardly facing vertical rib of said central cup,
so that said vertical slots in the wall of said central cup align with the vertical slots in the inner wall of said first concentric ring.

8. The container of claim 2, further comprising:
an inner central cup that fits within said central plant holding cup;
said inner central cup capable of retaining a plant without engaging said ashes or soil of said first or second concentric rings.

9. The container of claim 3, wherein said central cup, said first concentric ring and said second concentric ring are made of rigid injection molded plastic.

* * * * *